United States Patent
Foster et al.

(10) Patent No.: US 10,143,126 B2
(45) Date of Patent: *Dec. 4, 2018

(54) PLANNING AND CONTROL OF AUTONOMOUS AGRICULTURAL OPERATIONS

(71) Applicants: CNH Industrial America LLC, New Holland, PA (US); Autonomous Solutions, Inc., Mendon, UT (US)

(72) Inventors: Christopher Alan Foster, Mohnton, PA (US); John Henry Posselius, Ephrata, PA (US); Brian Robert Ray, Chicago, IL (US); Bret Todd Turpin, Wellsville, UT (US); Daniel John Morwood, Petersboro, UT (US); Nathan Eric Bunderson, Providence, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/179,669

(22) Filed: Jun. 10, 2016

(65) Prior Publication Data

US 2017/0354079 A1 Dec. 14, 2017

(51) Int. Cl.
*A01B 69/04* (2006.01)
*G05D 1/02* (2006.01)
*A01B 79/00* (2006.01)

(52) U.S. Cl.
CPC ......... *A01B 69/008* (2013.01); *G05D 1/0276* (2013.01); *A01B 79/005* (2013.01); *G05D 2201/0201* (2013.01)

(58) Field of Classification Search
CPC ..................... A01B 69/008; G05D 1/0276
See application file for complete search history.

(56) References Cited

U.S. PATENT DOCUMENTS

| 6,088,644 A | 7/2000 | Brandt et al. |
| 6,128,574 A | 10/2000 | Diekhans |

(Continued)

FOREIGN PATENT DOCUMENTS

DE 102007008624 A1 8/2008

OTHER PUBLICATIONS

"Trimable Conducts Live Demonstrations of NextSwath End of Row Turns;" Gale Group Trade arid Industry; Aug. 26, 2014.

(Continued)

*Primary Examiner* — Rachid Bendidi
(74) *Attorney, Agent, or Firm* — Rebecca L. Henkel; Rickard K. DeMille

(57) ABSTRACT

The agricultural control system includes a base control system configured to communicate with a vehicle control system of an agricultural vehicle. The base control system is configured to plan an implement path through an agricultural field for an agricultural implement coupled to the agricultural vehicle based at least in part on at least one characteristic of the agricultural field. The base control system is configured to plan a vehicle path of the agricultural vehicle based at least in part on the planned implement path. The base control system is configured to send a first signal to the vehicle control system indicative of the vehicle path.

17 Claims, 5 Drawing Sheets

(56) References Cited

U.S. PATENT DOCUMENTS

| | | | |
|---|---|---|---|
| 6,141,614 A | 10/2000 | Janzen et al. | |
| 6,236,924 B1 | 5/2001 | Motz et al. | |
| 6,336,051 B1 | 1/2002 | Pangels et al. | |
| 6,804,587 B1 | 10/2004 | O'Connor et al. | |
| 7,451,030 B2 | 11/2008 | Eglington et al. | |
| 7,490,678 B2 | 2/2009 | Unruh et al. | |
| 7,505,848 B2 | 3/2009 | Flann et al. | |
| 7,580,783 B2 | 8/2009 | Dix | |
| 7,706,948 B2 | 4/2010 | Dix et al. | |
| 7,715,979 B2 | 5/2010 | Dix | |
| 7,747,370 B2 | 6/2010 | Dix | |
| 7,860,628 B2 | 12/2010 | Lange | |
| 8,112,201 B2 | 2/2012 | Aral | |
| 8,170,785 B2 | 5/2012 | Diekhans et al. | |
| 8,190,364 B2 | 5/2012 | Rekow | |
| 8,204,654 B2 | 6/2012 | Sachs et al. | |
| 8,209,075 B2 | 6/2012 | Senneff et al. | |
| 8,285,459 B2 | 10/2012 | Diekhans et al. | |
| 8,346,443 B2 | 1/2013 | Senneff et al. | |
| 8,494,726 B2 | 7/2013 | Peake et al. | |
| 8,589,013 B2 | 11/2013 | Pieper et al. | |
| 8,626,408 B1 | 1/2014 | Satzler et al. | |
| 8,635,011 B2 | 1/2014 | Senneff et al. | |
| 8,655,536 B2 | 2/2014 | Peake et al. | |
| 8,807,261 B2 | 8/2014 | Subrt et al. | |
| 8,818,652 B2 | 8/2014 | Thompson et al. | |
| 8,825,263 B1 | 9/2014 | Nelson, Jr. | |
| 9,058,560 B2 | 6/2015 | Johnson | |
| 2003/0208311 A1* | 11/2003 | McClure | A01B 69/004 701/50 |
| 2004/0193348 A1* | 9/2004 | Gray | A01B 69/008 701/50 |
| 2008/0249692 A1* | 10/2008 | Dix | A01B 69/008 701/50 |
| 2008/0262669 A1 | 10/2008 | Smid et al. | |
| 2010/0017075 A1 | 1/2010 | Beaujot | |
| 2010/0228427 A1 | 9/2010 | Anderson et al. | |
| 2011/0160961 A1 | 6/2011 | Wollenhaupt et al. | |
| 2011/0231061 A1* | 9/2011 | Reeve | A01B 69/008 701/41 |
| 2012/0215410 A1* | 8/2012 | McClure | A01B 79/005 701/50 |
| 2012/0283909 A1 | 11/2012 | Dix | |
| 2012/0296529 A1* | 11/2012 | Peake | A01B 69/008 701/50 |
| 2013/0173321 A1 | 7/2013 | Johnson | |
| 2013/0184944 A1 | 7/2013 | Missotten et al. | |
| 2013/0304300 A1* | 11/2013 | Peake | B62D 15/025 701/23 |
| 2014/0081568 A1 | 3/2014 | Pieper et al. | |
| 2014/0277675 A1* | 9/2014 | Anderson | G05B 15/02 700/114 |
| 2015/0101519 A1 | 4/2015 | Blackwell et al. | |
| 2015/0346728 A1* | 12/2015 | Peake | G05D 1/0212 701/23 |
| 2016/0313737 A1* | 10/2016 | Berkemeier | G05D 1/0212 |
| 2017/0354078 A1 | 12/2017 | Foster et al. | |

OTHER PUBLICATIONS

Hill, Peter; "Auto-steering helps reduce unnecessary fuel use;" Crops; May 31, 2008.

"Correcting for Implement Offsets;" AG Leader Technology; last visited Nov. 3, 2014.

Choudhury et al; "A Coverage Planning Algorithm for Agricultural Robots;" Indian Institute of Technology Kharagpur, India and Carnegie Mellon University; Aug. 2009.

Hest, David; "Guidance at the right price;" Farm Industry News; Apr. 1, 2007.

Ryerson et al; "Vehicle Path Planning for Complete Field Coverage Using Genetic Algorithms;" Agricultural Enginerring International: the CIGR Ejournal; Jul. 2007.

Hachour, O; "Path Planning of Autonomous Mobile Robot;" International Journal of Systems Applications, Engineering and Development, Issue 4, vol. 2; Dec. 31, 2008.

\* cited by examiner

PLANNING AND CONTROL OF AUTONOMOUS AGRICULTURAL OPERATIONS

BACKGROUND

The subject matter disclosed herein relates generally to agricultural operations and, more specifically, to planning and control of autonomous agricultural operations.

In recent years, vehicles, such as agricultural tractors, have been designed to operate at least partially autonomously (e.g., without input from a vehicle occupant) to perform various operations on a field of crops. A range of agricultural implements have been developed and are presently in use for tilling, planting, harvesting, and so forth. Such implements are typically coupled to the agricultural vehicle and towed behind the vehicle to perform such operations. In the event that an operator desires to perform an agricultural operation, the operator may engage a control system that instructs the agricultural vehicle to drive along a path (e.g., guidance swath) within the field. However, certain agricultural implements do not follow the same path as the towing vehicle, which can result in the implement skipping certain regions of the field or covering other regions multiple times (e.g., overlap). By skipping certain regions of the field, the agricultural operation may leave soil untilled or unplanted, or crops unharvested, for example. Further, overlapped regions may be over-tilled or over-planted, for example. As a result, the yield of crops may be reduced due to areas that were skipped (e.g., missed) or overlapped by the implement.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, an agricultural control system includes a base control system configured to communicate with a vehicle control system of an agricultural vehicle, wherein the base control system is configured to plan an implement path through an agricultural field for an agricultural implement coupled to the agricultural vehicle based at least in part on at least one characteristic of the agricultural field, to plan a vehicle path of the agricultural vehicle based at least in part on the planned implement path, and to send a first signal to the vehicle control system indicative of the vehicle path.

In a second embodiment, a non-transitory computer-readable medium comprising instructions configured to be executed by a processor of a base control system, wherein the instructions comprise instructions configured to cause the processor to plan an implement path through an agricultural field for an agricultural implement coupled to an agricultural vehicle based at least in part on at least one characteristic of the agricultural field, plan a vehicle path of the agricultural vehicle based at least in part on the planned implement path, and send a first signal to a vehicle control system of the agricultural vehicle indicative of the vehicle path.

In a third embodiment, a control system for an agricultural vehicle, includes a controller includes a processor operatively coupled to a memory, wherein the controller is configured to receive a first signal indicative of a vehicle path, receive a second signal indicative of an implement path, send a third signal indicative of instructions to control a steering control system, a speed control system, or a combination thereof, to travel along the vehicle path, receive a fourth signal indicative of a position of the agricultural implement, update the vehicle path based at least in part on a difference between the implement path and the position of the agricultural implement, and send a fifth signal indicative of instructions to control the steering control system, the speed control system, or a combination thereof to change the direction, the speed, or any combination thereof, of the agricultural vehicle based on the updated vehicle path.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
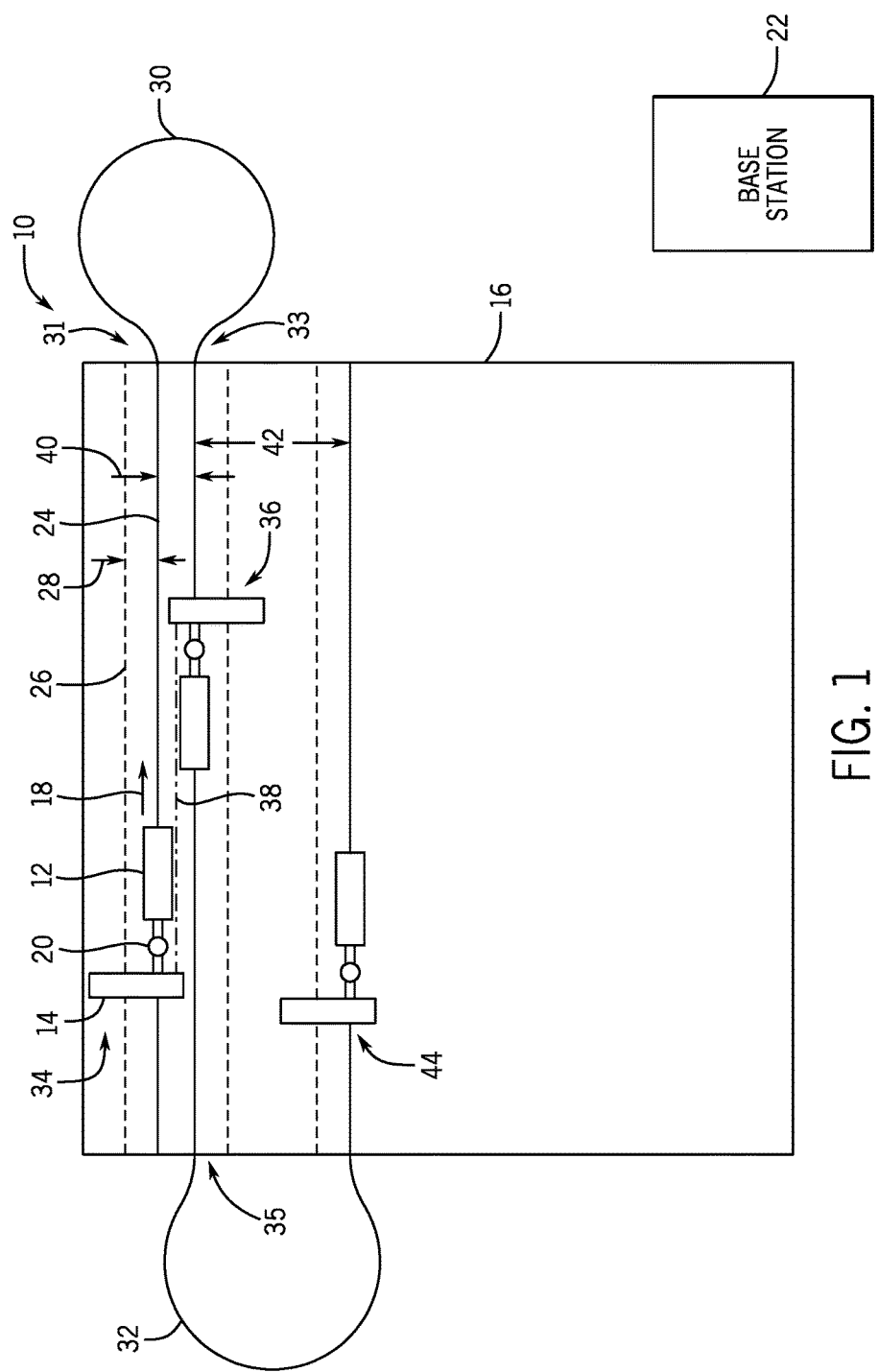
FIG. 1 is a schematic diagram of an embodiment of global control system that includes an agricultural vehicle coupled to an agricultural implement within an agricultural field.

Turning now to the drawings, FIG. 1 is a schematic diagram of an embodiment of a global control system 10 that includes an agricultural vehicle 12 coupled to an agricultural implement 14 within an agricultural field 16. The agricultural vehicle 12 (e.g., tractor or other prime mover) is configured to tow the agricultural implement 14 along a direction of travel 18 to perform various agricultural operations on the agricultural field 16. For example, the agricultural implement 14 may be a tillage tool, a fertilizer application tool, a seeding or planting tool, or a harvesting tool, among others. While the agricultural implement 14 is towed by (e.g., in front of or behind) the agricultural vehicle 12 in the illustrated embodiment using a hitch 20, such as a drawbar, a two-point hitch, or a three point hitch, it should be appreciated that in certain embodiments, the agricultural implement may be integrated into the agricultural vehicle. Further, while the control system 10 is referred to as a "global" control system 10, "global" merely identifies the control system (e.g., to distinguish the global control system 10 from the other control systems disclosed herein). It should be appreciated that while the illustrated embodiments may be described with a base control system (e.g., the base station controller) performing certain operations and the vehicle control system performing other operations, any suitable combination of the base control system and the vehicle control system may be used to perform various operations. For example, the operations may be performed on the vehicle without a base station.

In the illustrated embodiment, the agricultural vehicle 12 is configured to operate at least partially autonomously (e.g., without input from an operator present in the cab of the agricultural vehicle 12). Accordingly, an automatic system (e.g., control system) may direct the agricultural vehicle 12 and the agricultural implement 14 throughout the agricultural field 16 without direct control (e.g., steering control, speed control, etc.) by an operator. In the illustrated embodiment, the autonomous agricultural vehicle 12 is configured to communicate with a controller of a base station 22 of the global control system 10. As discussed in detail below, the global control system 10 may include a controller of the agricultural vehicle 12, the controller of the base station 22, a controller of the agricultural implement 14, or a combination thereof. In further embodiments, some aspects of the agricultural vehicle 12 may be substantially manually controlled. For example, an operator may be located within the base station 22 and operate certain controls to control the agricultural vehicle 12 and/or the agricultural implement 14. As such, the agricultural vehicle 12 may traverse the agricultural field 16 without an operator directly controlling operation of the agricultural vehicle 12 from within the agricultural vehicle 12 (e.g., autonomous operation).

Figure 2:
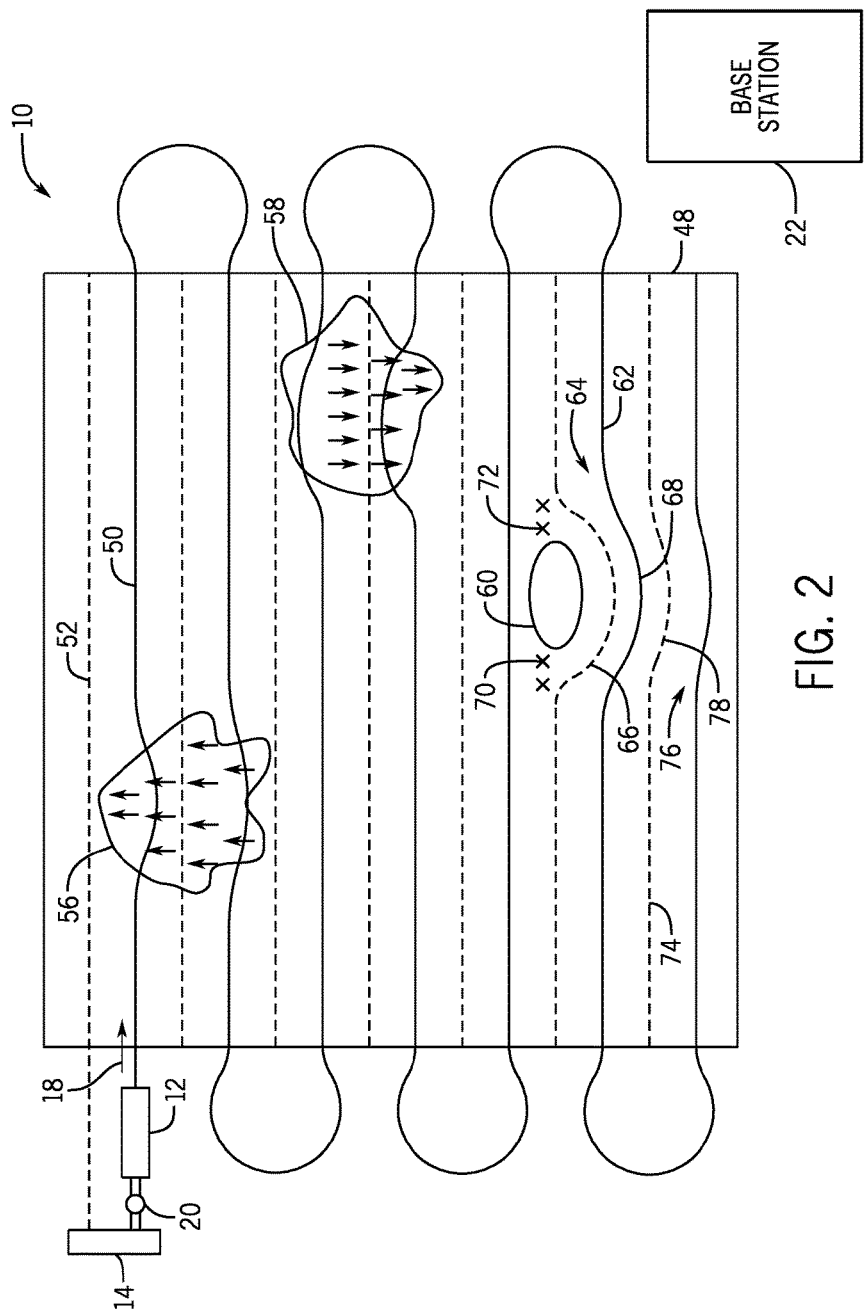
FIG. 2 is a schematic diagram of another embodiment of the global control system that includes the agricultural vehicle coupled to the agricultural implement within another agricultural field.
Figure 3:
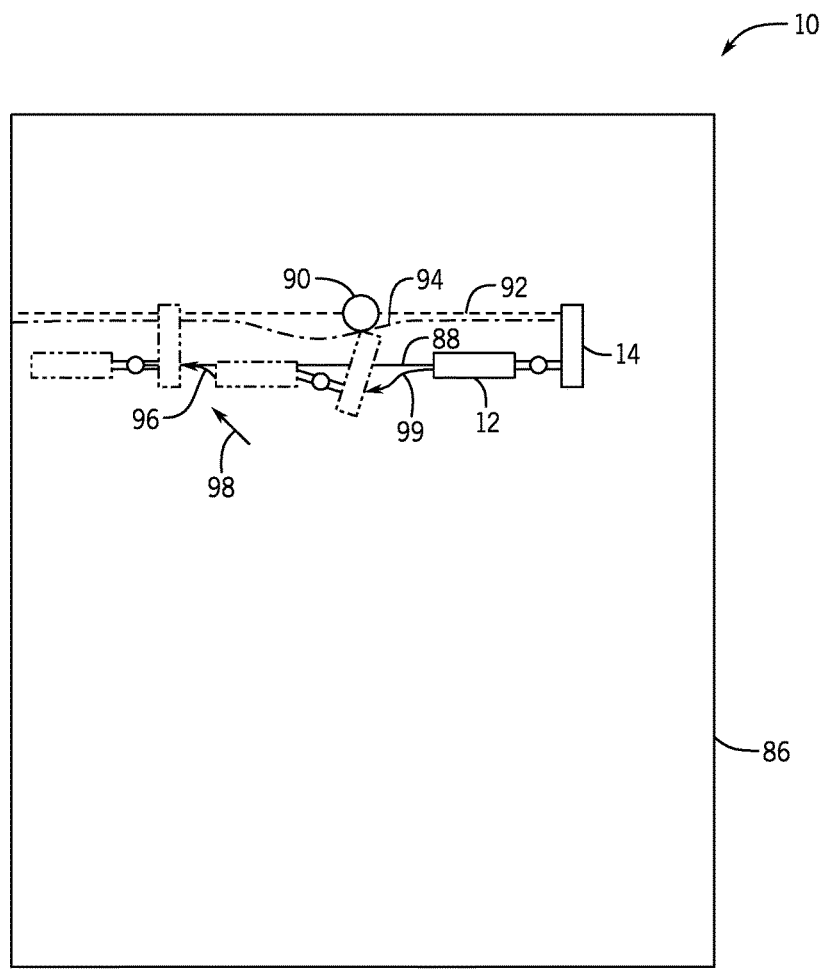
FIG. 3 is a schematic diagram of an embodiment of the global control system that includes the agricultural vehicle coupled to the agricultural implement within another agricultural field.
Figure 3:
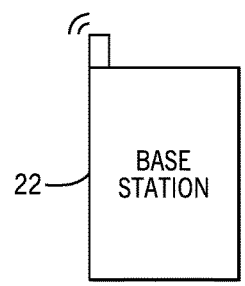

To traverse the agricultural field 16, the base station 22 may send instructions to the agricultural vehicle 12 to follow a planned vehicle path 24 (e.g., guidance swath) through the agricultural field 16. "Paths" may include distances and directions and/or target locations where the agricultural vehicle 12 and/or the implement 14 are directed to travel to cover various regions of the agricultural field 16. While the paths are indicated in FIGS. 1-3 on the field, the base station 22 may send instructions indicative of distances and directions to the agricultural vehicle or send locations for interpolation. If the agricultural implement 14 is centered behind the agricultural vehicle 12 (e.g., without an offset), an implement path through the field may correspond to the vehicle path through the field. In certain embodiments, the global control system 10 may determine a vehicle path that positions the agricultural implement 14 to substantially reduce skipped or overlapped regions of the field by accounting for the geometry of the implement, such as the offset, and/or the capabilities of the vehicle and/or the implement. The geometry of the agricultural implement 14 and/or the geometry of the agricultural vehicle 12 may include a vehicle and/or implement size, shape and/or weight, a type of hitch used to connect the implement to the vehicle, a type of wheels of the implement (e.g., castering or non-castering), a region where the implement performs the agricultural operation, and the like. Further, the vehicle and/or the implement capabilities may include a turn radius of the vehicle (e.g., minimum turn radius), a turn radius of the implement (e.g., minimum turn radius), a turn radius from the combination of the vehicle and the implement (e.g., a turn radius at which the tire of the tractor contacts the implement based on the implement and tractor geometry), a turn radius while the implement is raised (e.g., in transport), a turn radius while the implement is lowered (e.g., in operation), a rate of change of direction of the vehicle, whether the wheels of the implement are controllable, and the like. By accounting for the geometry of the agricultural implement 14 and/or the capabilities of the agricultural vehicle 12 and the agricultural implement, more accurate path planning for implement such that the efficiency of the agricultural operations (e.g., tillage operations, planting operations, harvesting operations, etc.) are substantially enhanced.

The base station 22 may plan an implement path 26 for the agricultural implement 14. In the illustrated embodiment, the base station 22 plans the implement path 26 based on the implement geometry to cover the agricultural field 16 while substantially reducing overlapped or skipped regions. The base station 22 plans a first segment 34 (e.g., portion of the field before end-of-row turn 30) of the implement path 26 to cover the border of the agricultural field 16 based on the geometry of the agricultural field 16 and the geometry and/or the capabilities of the agricultural implement 14. After the first segment 34 of the agricultural field 16 is planned to perform the agricultural operation on a first region of the agricultural field 16, the base station 22 plans a second segment 36 (e.g., to perform the agricultural operation on a second region agricultural field between end-of-row turn 30 and end-of-row turn 32, adjacent to the first region) based on the implement path 26 of the first segment 34 and the geometry and/or the capabilities of the agricultural implement 14. For example, the second segment 36 is planned where an end of an operation region, i.e., the region covered by the tilling, planting, harvesting, or other operation, of the agricultural implement 14 during the agricultural operation on the first segment 34 aligns with the end of the operation region of the agricultural implement 14 during the agricultural operation on the second segment 36, as denoted by line 38. That is, the base station 22 plans the second segment 36 of the implement path 26 in a manner that substantially reduces overlapped and/or skipped regions by aligning the operating regions of each segment 34, 36 of the implement path 26 based on the geometry and/or the capabilities of the agricultural implement 14.

The base station 22 may plan the vehicle path 24 that moves the implement along the implement path 26. For example, the base station 22 may determine the planned vehicle path 24 based on an offset 28 and/or the geometry (e.g., width) of the agricultural implement 14. The offset 28 is a difference between a lateral center line of the agricultural implement 14 and a lateral center line of the agricultural vehicle 12. Because the planned vehicle path 24 is determined based on the planned implement path 26, the base station 22 (e.g., base station controller) plans the vehicle path 24 with the first segment 34 a first distance 40 from the second segment 36 of the vehicle path, and the second segment 36 of the vehicle path a second distance 42 from the third segment 44 of the vehicle path.

The base station 22 (e.g., base station controller) plan a first segment 34 of the vehicle path 24 based at least in part on the first segment 34 of the implement path 26 to direct the agricultural implement 14 along the first region. The base station 22 (e.g., base station controller) may determine a second segment 36 of the vehicle path 24 based at least in part on the second segment 36 of the implement path 26 to direct the agricultural implement 14 along the second region. That is, the base station 22 (e.g., base station controller) may determine a second segment 36 of the vehicle path 24 based at least in part on the second segment 36 of the implement path 26 to drive the agricultural implement 14 along the second region. As discussed below, the base station 22 (e.g., base station controller) may determine a first end-of-row turn 30 of the vehicle path 24 between an end 31 of the first segment 34 of the vehicle path 24 and a beginning 33 of a second segment 36 of the vehicle path 24 to enable the agricultural vehicle 12 to turn around and to perform the agricultural operation on the second region. The base station 22 (e.g., base station controller) may then output a first signal indicative of the vehicle path. The agricultural vehicle 12, the agricultural implement 14, and the base station 22 may each include a transceiver that enables communication between the control systems of each element.

During end-of-row turns 30 and 32 of FIG. 1, the vehicle path 24 may be planned without regard to the position of the implement relative to the field because the agricultural implement 14 is not engaged with the soil on the end-of-row turns 30 and 32. For example, the base station 22 (e.g., base station controller) may determine a first end-of-row turn 30 of the vehicle path 24 at an end 31 of the first segment 34 of the vehicle path 24 independently of the implement path 26 between the first segment 34 of the implement path and a second segment 36 of the implement path. That is, after the end 31 of the first segment, the vehicle path 24 is planned independently of the implement path 26 and/or without regard to the position of the implement relative to the field during the end-of-row turn 30. The base station 22 (e.g., base station controller) may then determine the vehicle path 24 of the end-of-row turn 30 that aligns the vehicle path 24 and/or the implement path 26 at an end of the end-of-row turn 30 with the beginning 33 of the second segment 36 to perform the agricultural operation on the second region. For example, the base station controller may be configured to determine the first end-of-row turn 30 based at least in part on capabilities of the agricultural vehicle 12, capabilities of the agricultural implement 14, or both. Moreover, the implement segment 36 may be accounted for in planning the end-of-row turn 30. That is, the base station controller may be configured to determine the first end-of-row turn 30 in a manner that connects the first implement segment 34 with the second implement segment 36. Further, the base station controller may determine a second end-of-row turn 32 of the vehicle path at an end 35 of the second segment 36 of the vehicle path 24 independently of the implement path between the second segment 36 of the implement path 26 and a third segment 44 of the implement path 26.

The base station 22 plans the vehicle path 24 such that the agricultural vehicle 12 travels a path that enables the agricultural implement 14 to cover the implement path 26. In conventional systems, if the agricultural implement 14 is offset from the center of the agricultural vehicle 12, then the offset may cause the agricultural implement 14 to skip or overlap regions when traversing the agricultural field 16 because the planned vehicle path 24 may not account for the geometry of the agricultural implement 14. By planning the vehicle path 24 based on the implement path 26, the control system 10 substantially reduces skips and overlaps of regions, thereby leaving fewer regions under or over tilled, unplanted, or unharvested, for example.

While some embodiments described below may include additional path planning (e.g., the implement path), other embodiments may account for the offset without performing additional path planning. For instance, in some embodiments, the base control system (e.g., base station controller) may be configured to plan a vehicle path based at least in part on an offset between the vehicle and the implement. The base control system may plan the first segment of the vehicle path based on the offset and plan the end-of-row turn 30 independent (e.g., without regard to the position of the implement relative to the agricultural field) of the offset. Then, the base control system may send a signal indicative of the vehicle path.

FIG. 2 is a schematic diagram of another embodiment of the global control system 10 that includes the agricultural vehicle 12 coupled to the agricultural implement 14 within another agricultural field 48. As mentioned above, the agricultural implement 14 may be towed by coupling the agricultural implement 14 to the agricultural vehicle 12 by a hitch 20. In certain embodiments, the orientation of the agricultural implement 14 relative to the agricultural vehicle may vary as the implement follows the agricultural vehicle 12 due to rotation about the hitch angle. For example, if the field has slopes, then the agricultural implement 14 may pivot with respect to the agricultural vehicle 12 such that the agricultural implement 14 may not follow the same path that the agricultural implement 14 would follow on a flat surface. This process may be referred to as implement drift. Because orientation of the agricultural implement 14 with respect to the agricultural vehicle 12 may vary as the agricultural vehicle 12 traverses the agricultural field 16, it may be desirable to determine an implement path 26 that accounts for the expected orientation (e.g., implement drift) of the agricultural implement 14 based on the capabilities of the agricultural implement 14 as well as one or more characteristics of the agricultural field 48.

In the illustrated embodiment, the agricultural vehicle 12 receives instructions from the base station 22 indicative of a vehicle path 50 and/or an implement path 52. The vehicle path 50 may be determined based at least in part on characteristics of the agricultural field 48, such as the terrain (e.g., slopes, bumps, hills, etc.) and/or obstacles (e.g., water, boulders, etc.). The base station 22 (e.g. base station controller) may first determine the implement path 52, and then determine the vehicle path 50 that substantially establishes the determined implement path 52. As described above, the implement path 52 refers to the planned path of the agricultural implement 14 through the field. The vehicle path is determined such that the implement path substantially reduces overlapped and/or skipped regions of the field, as compared to a vehicle path that does not account for the position of the agricultural implement 14.

In the illustrated embodiment, the base station 22 (e.g. base station controller) determines a vehicle path 50 that substantially establishes the planned implement path 52. The vehicle path 50 may be based at least in part on the geometry of the agricultural vehicle 12, the geometry of the agricultural implement 14, the characteristics (e.g., terrain) of the agricultural field 48, or a combination thereof, among other factors. Further, the vehicle path 50 may be based at least in part on at least one capability of the agricultural vehicle 12, at least one capability of the agricultural implement 14, at least one capability of the hitch between the agricultural vehicle 12 and the agricultural implement 14, or a combination thereof. For example, the capabilities the at least one capability of the agricultural vehicle may include a turn radius of the agricultural vehicle, a rate of change of direction of the vehicle, or any combination thereof, and the at least one capability of the agricultural implement may include a turn radius of the agricultural implement, whether at least one wheel of the implement is controllable, or any combination thereof.

The agricultural field 48 includes a hill 56 having a slope in relation to the surrounding terrain. The planned implement path 52 is approximately straight across the hill 56. To maintain the approximately straight implement path 52, the base station 22 (e.g., base station controller) may determine the vehicle path 50 to account for rotation of the agricultural implement 14 about the hitch as the agricultural vehicle 12 and the agricultural vehicle move over the hill 56. For example, the base station 22 (e.g., base station controller) may determine the vehicle path 50 based on a relationship between hitch angle and hill slope magnitude (e.g., via a lookup table, an equation, a simulation, etc.). Further, the sensors of the implement may be used to measure an amount of implement drift. Similarly, with respect to another hill 58 with a slope directed in an opposite direction, the base station 22 (e.g., base station controller) may determine a vehicle path 50 that establishes the planned implement path 52.

In addition, in the illustrated embodiment, the base station 22 (e.g., base station controller) determines the vehicle path 62 based at least in part on geometry and capabilities of the agricultural vehicle 12, the agricultural implement 14, the hitch 20, or the like. The vehicle path 62 at segment 64 around obstacle 60 may be planned to establish an adjusted implement path 66 that substantially reduces overlapped and/or skipped regions of the field while satisfying geometry related to the obstacle, the geometry of the agricultural vehicle 12, the geometry of the agricultural implement 14, the geometry of the hitch 20, the capability of the agricultural vehicle 12, the capability of the agricultural implement 14, the capability of the hitch 20, or a combination thereof. For example, the planned implement path 52 may be established based on the location, size, and shape of the obstacle. The base station 22 (e.g., base station controller) may then determine the vehicle path 62 having a curved path 68 that establishes the planned implement path while satisfying the capabilities of the agricultural vehicle 12 (e.g., minimum/maximum turning radius, minimum/maximum turning rate, etc.). Further, the base station 22 (e.g., base station controller) determines an adjusted implement path 76 based on the curved path 66 that again substantially reduces the overlapped and/or skipped regions. For example, the base station 22 (e.g., base station controller) plans an adjusted implement path that includes a curve 78 to reduce the overlapped and/or skipped regions. If a vehicle path is not determined that satisfies the capabilities of the vehicle, then the base station controller may adjust the implement path, determine a second vehicle path based on the adjusted implement path, and determine whether the second vehicle path satisfies the capabilities of the vehicle. In this manner, the base station 22 (e.g., base station controller) may repeatedly adjust the vehicle paths and the implement paths via an iterative process to reduce overlapped and/or skipped regions while satisfying vehicle capabilities, implement capabilities, hitch capabilities, or any combination thereof. While the base station 22 (e.g., base station controller) of FIG. 2 establishes the implement path initially and then adjusts the paths to satisfy the vehicle capabilities/geometry, implement capabilities/geometry, hitch capabilities/geometry, and terrain information, in other embodiments, the base station 22 (e.g., base station controller) may conversely begin by establishing a vehicle path that satisfies the capabilities of the vehicle, and then repeatedly adjusting the implement path until the implement path substantially reduces overlapped and/or skipped regions. After the implement path and vehicle path are determined by the base station 22 (e.g., base station controller), the agricultural vehicle 12 may begin traversing the agricultural field 48. The process of determining the implement and vehicle path may also be performed on the vehicle. In some embodiments, the base station may assign the vehicle a task and the vehicle controller may determine the implement path and the vehicle path.

FIG. 3 is a schematic diagram of the global control system 10 that includes the agricultural vehicle 12 coupled to the agricultural implement 14 within an agricultural field 86. For example, the agricultural vehicle 12 and the agricultural implement may traverse the agricultural field as illustrated in the phantom lines. As the agricultural vehicle 12 moves along the vehicle path 88 to traverse the agricultural field 86, the agricultural vehicle 12 and/or the implement 14 may encounter an obstacle, such as a rock, a slope, water, loose dirt, or the like. Due to the disturbance, the agricultural vehicle 12, the agricultural implement 14, or both may diverge from the desired path. To account for these disturbances, a controller of the agricultural vehicle may control the agricultural vehicle 12 to align the vehicle with the vehicle path 88 and/or to align the agricultural implement 14 with the implement path 92.

As illustrated, as the agricultural vehicle 12 tows the agricultural implement 14, the agricultural implement 14 encounters a rock 90 that deflects the agricultural implement 14 from the implement path 92. An actual path 94 of the agricultural implement 14 diverges from the implement path 92 due to the encounter with the rock 90, and the controller of the agricultural vehicle 12 and/or the controller of the base station adjusts the path of the agricultural vehicle 12 to reduce a difference between the actual path 94 and the planned implement path 92. For example, the controller of the agricultural vehicle and/or the controller of the base station directs the agricultural vehicle 12 in a direction 98 to realign the agricultural implement 14 with the implement path 92. For instance, the controller of the agricultural vehicle may receive a first signal from a base control system indicative of the vehicle path. The controller may then send a second signal indicative of instructions to control a steering control system, a speed control system, or a combination thereof, to travel along the vehicle path. The controller may receive a third signal indicative of a position of the agricultural vehicle, the agricultural implement, or any combination thereof, to adjust the vehicle path based on the position of the agricultural vehicle, the position of the agricultural implement, or any combination thereof. For example, the controller may receive a signal from one of the sensors of the sensor assembly. The controller may send a third signal indicative of instructions to control the steering control system, the speed control system, or any combination thereof to adjust the direction, the speed, or a combination thereof, of the agricultural vehicle, the agricultural implement, or any combination thereof, based on the vehicle path adjusted based on the position of the agricultural vehicle, the position of the agricultural implement, or a combination thereof.

In certain embodiments, the agricultural vehicle 12 may control the agricultural implement 14 to avoid contacting the rock 90. For example, the agricultural vehicle controller and/or the base station controller may receive signals indicative of the rock 90 in the agricultural field. The agricultural vehicle controller and/or the base station controller may determine a vehicle path that enables the agricultural implement 14 to evade the rock 90. If the path determination is performed at a base station, the base station controller may communicate the vehicle path to the vehicle controller. Further, the agricultural vehicle controller may send signals indicative of instructions to control the steering control system of the agricultural vehicle 12 to steer the agricultural vehicle 12 to travel along path 99, thereby causing the agricultural implement 14 to evade the rock 90. As such, the vehicle controller may adjust the agricultural vehicle path to cause the agricultural implement 14 avoid the rock 90.

While the illustrated embodiment is described with the controller of the agricultural vehicle 12 controlling the path traveled by the agricultural vehicle, in other embodiments, the base control system (e.g., of the base station, another vehicle, etc.) may receive signals from the controller of the agricultural vehicle and determine the vehicle path adjusted based on the position of the agricultural vehicle, the position of the agricultural implement, or a combination thereof. Moreover, after an adjustment for a disturbance occurs during the agricultural operation, the agricultural vehicle controller and/or the controller of the base station may send signal(s) to the base station 22 (e.g., base station controller) to incorporate the disturbance into future path planning operations. For example, the rock 90 may be included as one of the field information with regard to the path planning described with respect to FIG. 2. For example, the base station 22 (e.g., base station controller) may generate a map of prior disturbances associated with controlling the agricultural vehicle 12 while the implement performs the agricultural operations. For example, the controller may utilize the map to identify characteristics of the agricultural field based on the prior disturbances. For instance, the controller may determine a location, a size, and/or a shape of slopes, rocks, bodies of water, field boundaries, wet areas of the field, or other characteristics related to the layout and/or obstructions within the field.

Figure 4:
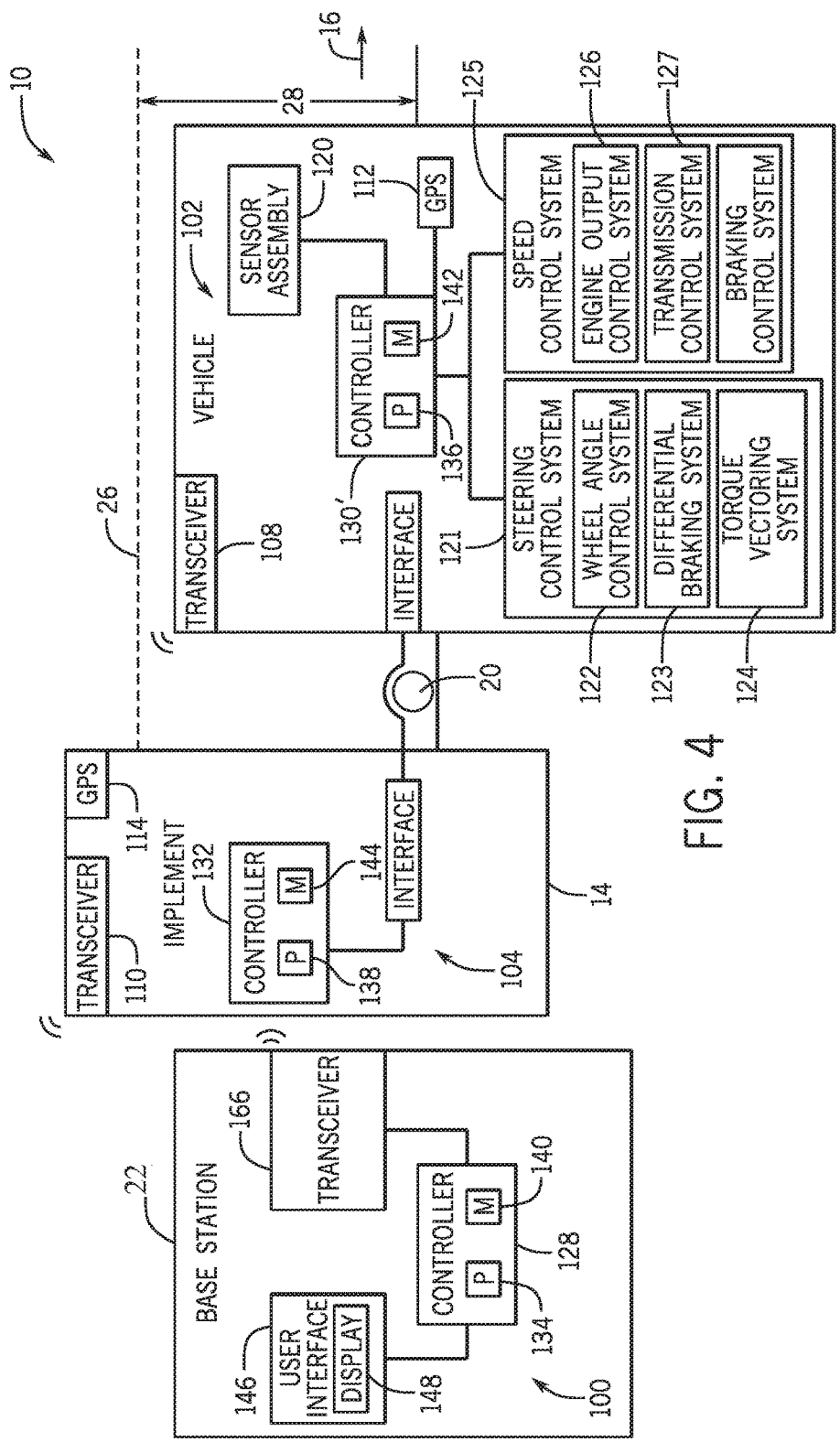
FIG. 4 is a block diagram of an embodiment of a control system that may be employed to control the agricultural vehicle of FIGS. 1-3.

FIG. 4 is a schematic diagram of an embodiment of a global control system 10 that may be utilized to control the agricultural vehicle 12 and/or the agricultural implement 14 of FIGS. 1-3. In the illustrated embodiment, the global control system 10 includes a base control system 100, a vehicle control system 102, and an implement control system 104, and each control system has a transceiver 106, 108, and 110, respectively, to establish wireless communication link(s). For example, transceiver 106 may communicate wirelessly with transceivers 108 and 110. Further, while each control system includes a single transceiver, multiple transceivers in any control system may be used to communicate at various frequency ranges within the electromagnetic spectrum. For example, the vehicle control system and the implement control system may communicate (e.g., wirelessly or wired) with one another. For instance, the vehicle control system and the implement control system may communicate with one another via a communication protocol (e.g., local interconnect network (LIN) communication, WiFi communication, Ethernet communication, Controller Area Network (CAN) communication, international organization for standardization 11783 (ISO bus) communication, etc.). Further, the transceivers 108 and 110, or another transceiver of the vehicle and implement control system 102 and 104, respectively, may communicate using another standard protocol (e.g., cellular network) or a proprietary protocol.

In the illustrated embodiment, the agricultural vehicle 12 and the agricultural implement 14 include spatial locating devices 112 and 114, respectively, which are each mounted to a respective one of the agricultural vehicle 12 and the agricultural implement 14, and configured to determine a position of the agricultural vehicle 12 or the agricultural implement 14, respectively. As will be appreciated, the spatial locating devices 112 and 114 may include any suitable system configured to determine the position of the agricultural vehicle 12 and/or the position of the agricultural implement 14, respectively, such as global positioning system (GPS), receivers for example. Further, the spatial locating devices 112 and 114 may include inertial measurement units (IMU) which may be used in dead-reckoning processes to validate motion of the GPS position against acceleration measurements. For example, the IMU may be used for terrain compensation to correct or eliminate motion of the GPS position due to pitch and roll of the agricultural vehicle 12. In certain embodiments, the spatial locating devices 112 and/or 114 may be configured to determine the position of the agricultural vehicle 12 and/or the agricultural implement 14, respectively, relative to a fixed global coordinate system (e.g., via the GPS) or a fixed local coordinate system. Further, in some embodiments, the spatial location of the agricultural vehicle 12 or the agricultural implement 14 may be inferred. For example, the agricultural implement location may be inferred based on the geometry of the agricultural implement 14, the geometry of the agricultural vehicle 12, the location of the agricultural vehicle 12, the hitch angle, or a combination thereof. In certain embodiments, the transceivers 108 and/or 110 broadcast signal(s) indicative of the position(s) of the agricultural vehicle 12 and/or the agricultural implement 14 to the transceiver 106 of the base station 22 (e.g., base station controller).

In addition, the agricultural vehicle 12 includes a sensor assembly 120 to facilitate autonomous control of the agricultural vehicle 12. For example, the sensor assembly 120 may include multiple sensors (e.g., infrared sensors, ultrasonic sensors, magnetic sensors, etc.) used in controlling the agricultural vehicle 12. In certain embodiments, the sensor assembly 120 may include a hitch angle sensor 119 that determines an angle of the hitch 20 between the agricultural vehicle 12 and the agricultural implement 14. The agricultural vehicle 12 includes a steering control system 121 configured to control a direction of movement of the agricultural vehicle 12 and a speed control system 124 configured to control a speed of the agricultural vehicle 12.

The vehicle controller 36 may generate and send signal(s) to control one or more operations of the agricultural vehicle 12 and/or the agricultural implement 14. For instance, the vehicle controller 36 may send signal(s) to a steering control system 121 to control a direction of movement of the agricultural vehicle 12 and/or to a speed control system 125 to control a speed of the agricultural vehicle 12. The steering control system 121 may include a wheel angle control system 122, a differential braking system 123, and a torque vectoring system 124. The wheel angle control system 122 may automatically rotate one or more wheels and/or tracks of the agricultural vehicle 12 (e.g., via hydraulic actuators) to steer the agricultural vehicle 12 along a desired route. By way of example, the wheel angle control system 122 may rotate front wheels/tracks, rear wheels/tracks, and/or intermediate wheels/tracks of the agricultural vehicle, either individually or in groups. The differential braking system 123 may independently vary the braking force on each lateral side of the agricultural vehicle 12 to direct the agricultural vehicle 12 along the desired route. Similarly, the torque vectoring system 124 may differentially apply torque from an engine to wheels and/or tracks on each lateral side of the agricultural vehicle 12, thereby directing the agricultural vehicle 12 along a desired route. While the illustrated steering control system 121 includes the wheel angle control system 122, the differential braking system 123, and the torque vectoring system 124, it should be appreciated that alternative embodiments may include one or two of these systems, in any suitable combination. Further embodiments may include an automated steering control system having other and/or additional systems to facilitate directing the agricultural vehicle along the desired route.

In the illustrated embodiment, the automated speed control system 125 includes an engine output control system 126, a transmission control system 127, and a braking control system 129. The engine output control system 126 is configured to vary the output of the engine to control the speed of the agricultural vehicle 12. For example, the engine output control system 126 may vary a throttle setting of the engine, a fuel/air mixture of the engine, a timing of the engine, other suitable engine parameters to control engine output, or a combination thereof. In addition, the transmission control system 127 may adjust gear selection within a transmission to control the speed of the agricultural vehicle 12. Furthermore, the braking control system 129 may adjust braking force, thereby controlling the speed of the agricultural vehicle 12. While the illustrated automated speed control system 125 includes the engine output control system 126, the transmission control system 127, and the braking control system 129, it should be appreciated that alternative embodiments may include one or two of these systems, in any suitable combination. Further embodiments may include an automated speed control system having other and/or additional systems to facilitate adjusting the speed of the agricultural vehicle.

In the illustrated embodiment, the base control system 100, the vehicle control system 102, and the implement control system 104 each includes a controller, i.e., a base station controller 128, a vehicle controller 130, and an implement controller 132. Each controller 128, 130, and 132 include a processor 134, 136, and 138, respectively. The controllers 128, 130, and 132 may also include one or more storage devices and/or other suitable components, such as the memory devices 140, 142, and 144, respectively, operatively coupled to the processors 134, 136, and 138, respectively, to execute software, such as software for controlling the agricultural vehicle 12 and the agricultural implement 14, and so forth. Moreover, the processors 134, 136, and 138 may each include multiple processors, one or more "general-purpose" microprocessors, one or more special-purpose microprocessors, and/or one or more application specific integrated circuits (ASICS), or some combination thereof. For example, each processor 134, 136, and 138 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

Each memory device 140, 142, and 144 may include a volatile memory, such as random access memory (RAM), nonvolatile memory, such as read-only memory (ROM), flash memory, or any combination thereof. Each memory device 140, 142, and 144 may store a variety of information that may be used for various purposes. For example, each memory device 140, 142, and 144 may store processor-executable instructions (e.g., firmware or software) for the respective processors 134, 136, and 138 to execute, such as instructions for controlling the agricultural vehicle 12 and/or the agricultural implement 14. The storage device(s) (e.g., nonvolatile storage) may include ROM, flash memory, a hard drive, or any other suitable optical, magnetic, or solid-state storage medium, or a combination thereof. The storage device(s) may store data (e.g., planned paths for the vehicle, planned paths for the implement, obstacle information, etc.), instructions (e.g., software or firmware for controlling the vehicle, etc.), and any other suitable data.

In the illustrated embodiment, the base control system 100 includes a user interface 146 having a display 148. The controller 128 may receive input(s) (e.g., via the display 148, such as a touchscreen display, a mouse, a keyboard, etc.) related to planning paths for the agricultural vehicle 12, the agricultural implement 14, or both. While these are examples, various inputs and/or outputs may be received/sent to enable an operator to control aspects related to the vehicle and/or implement.

The controller 128 of the base control system 100 is configured to receive signal(s) indicative of one or more characteristics of the agricultural fields via the transceiver 166. While the base station control system 100 is shown as having a transceiver, any suitable number of transceivers may be used. Moreover, while the illustrated embodiment has the base control system (e.g., base station controller 128) located at a base station 22, the base control system may be located in the agricultural vehicle, another agricultural vehicle, or any other suitable location. For example, the agricultural vehicle controller may be used to perform one or more of the path planning steps and/or control steps. In certain embodiments, the controller 128 may receive signals (e.g., via the transceivers 106 and 108) from the agricultural vehicle 12 indicative of a location, a size, and/or a shape of slopes, rocks, bodies of water, field boundaries, or other characteristics related to the layout and/or obstructions within the field. Alternatively and/or additionally, the controller 128 may obtain the one or more characteristics of the agricultural fields from the memory 140 (e.g., stored from other processes, from agricultural operations, from the inputs to the user interface 146, etc.). In other embodiments, the controller 128 may obtain the one or more characteristics of the field via the spatial locating devices 112 and 114 or other systems suitable for identifying characteristics of the agricultural fields 16, 48, and 86. The controller 128 then determines the implement path based at least in part on the one or more characteristics (e.g., implement geometry and/or implement capabilities). For example, the controller 128 may determine the implement path to substantially reduce overlapping and/or skipping regions of the agricultural field.

The controller 128 may then determine the vehicle path that establishes the planned implement path. For example, the controller 128 may determine the vehicle path based at least in part on the one or more characteristics of the agricultural field and adjust the desired implement path 26, 52, and 92 such that the vehicle path 24, 50, and 88 and the implement path 26, 52, and 92 account for the at least one characteristic of the agricultural field 16, 48, and 86, the agricultural vehicle 12, and/or the agricultural implement 14, such as obstacles, vehicle size, implement offset, turn radius, and the like, as discussed above. Further, the implement path may be determined based at least in part on the agricultural implement 14 selected for the particular agricultural operation. In certain embodiments, the controller 128 may receive at least one of a geometry or a capability of the agricultural implement from an equipment library. For example, a tillage tool may have different characteristics from a seeding tool, such as a different size, turning radius, and the like. For instance, the tillage tool may have a first offset and a seeding tool may have a second offset, different from the first offset. As such, the controller 128 may determine the implement path for the tillage tool based at least in part on the characteristics of the selected tillage tool.

In the illustrated embodiment, after the controller 128 determines the vehicle path and the implement path, the controller 128 outputs signal(s) indicative of the vehicle path and/or the implement path (e.g., via the transceiver 106), to the transceiver 108 of the agricultural vehicle 12 to enable the controller 130 of the agricultural vehicle 12 to direct the agricultural vehicle along the path. After the controller 130 receives the vehicle path and/or implement path from the base station 22, the controller 130 may control the agricultural vehicle 12 based on the received vehicle path and/or implement path. In certain embodiments, the controller 132 of the implement may receive the implement path and control wheels or tracks of the implement based on the implement path. Further, in some embodiments, the controller of the implement may control the implement (e.g., via steerable implement wheels to control the implement relative to the agricultural vehicle) to travel along the implement path and the controller of the agricultural vehicle may control the agricultural vehicle to travel along the vehicle path.

The controller 130 may receive location signal(s) from the sensor assembly 120 (e.g., hitch angle sensor), the spatial locating devices 112 and/or 114 that indicate a location of the agricultural vehicle 12 and/or the agricultural implement 14. The controller 130 may determine a difference between the actual location of the agricultural vehicle 12 and/or the agricultural implement 14 and the target location on the vehicle path and/or the implement path by comparing the location of the agricultural vehicle 12 and/or the agricultural implement 14 with the vehicle path and/or the implement path. Further, the controller 130 may control the agricultural vehicle 12 and/or the agricultural implement 14 to reduce the difference to better align the implement 14 with the determined implement path.

Figure 5:
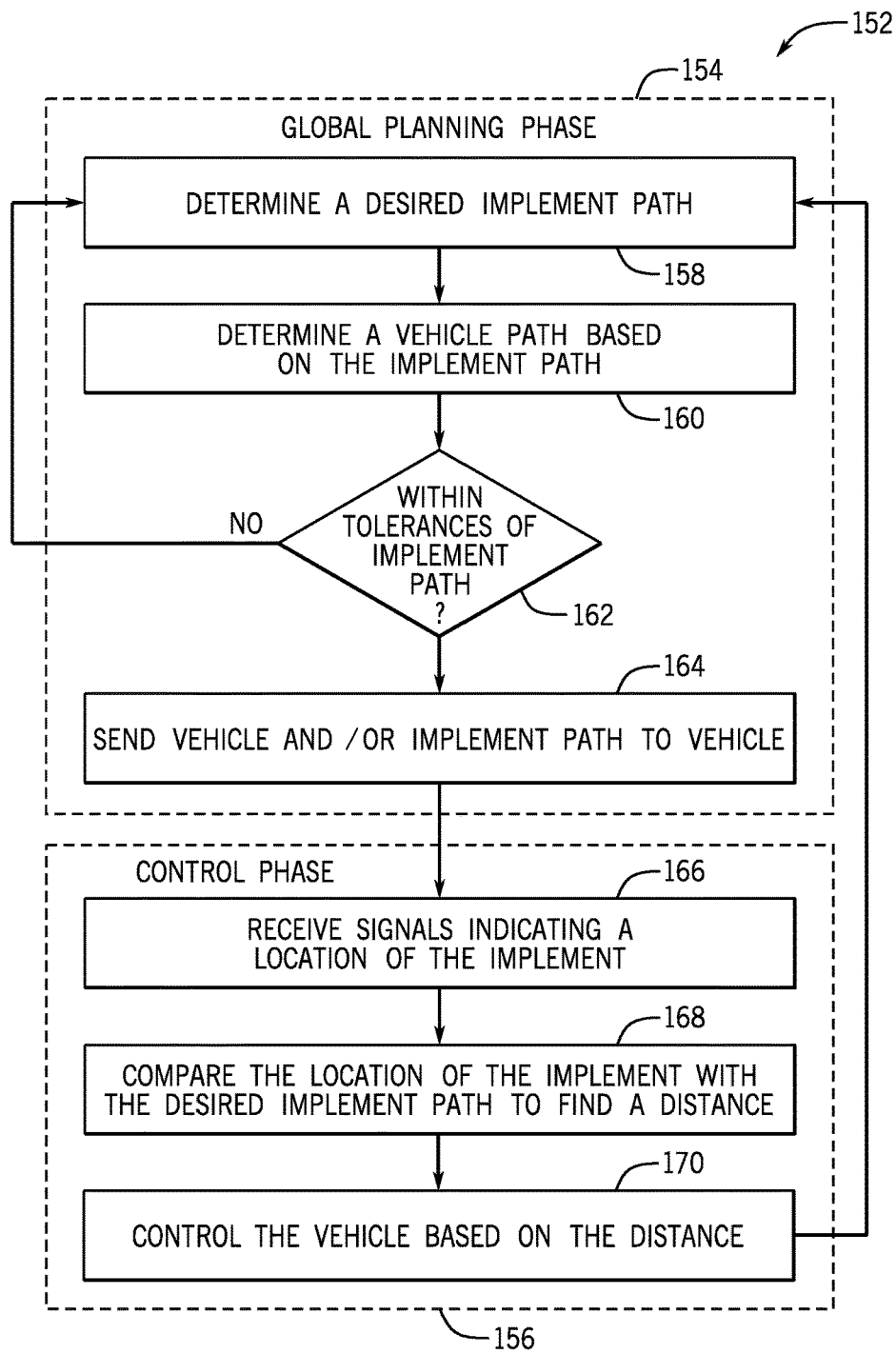
FIG. 5 is a flow diagram of an embodiment of a method for planning and controlling the agricultural vehicle.

FIG. 5 is a flow diagram of an embodiment of a method 152 for controlling the agricultural vehicle 12 and/or agricultural implement 14. The method 152 may be stored in one or more of the memories 140, 142, and 144 and executed as instructions (e.g., code) by one or more of the processors 134, 136, and 138, respectively. In the illustrated embodiment, at block 154, the controller 128 of the base station 22 (e.g., base station controller) may perform operations related to a global planning phase in which the implement path and the vehicle path are determined. Then, the controller 130 of the agricultural vehicle 12 performs operations related to controlling the agricultural vehicle 12 to move the agricultural vehicle 12 along the vehicle path.

In the global planning phase, at block 158, the controller 128 determines the implement path. For example, the controller 128 may receive one or more characteristics of the agricultural field 16, 48, and 86 as well as one or more characteristics of the agricultural vehicle 12 and/or agricultural implement 14. Based on the size of the agricultural implement 14, the turning radius of the agricultural vehicle 12, and other characteristics, the controller 128 plans the implement path 26, 52, and 92 that maximizes coverage (e.g., reduces skips) of the agricultural field 16, 48, and 86 while minimizing overlap of the coverage.

At block 160, the controller 134 then determines the vehicle path based at least in part on the implement path. The controller 134 determines the vehicle path such that the path meets the capabilities of the agricultural vehicle 12 to enable the agricultural vehicle 12 to drive the path while reducing an impact on the implement path 26, 52, and 92. At block 162, the controller 134 may determine whether the impact on the implement path 26, 52, and 92 exceeds a threshold tolerance. In the event that the impact on the implement path 26, 52, 92 is greater than a threshold, the controller 128 may continue refining the vehicle path 24, 50, and 88 and/or the implement path 26, 52, and 92. Once the vehicle path 24, 50, and 88 and the implement path 26, 52, and 92 are established, at block 164, the controller 134 may generate a signal to send the vehicle path 24, 50, and 88 and/or the implement path 26, 52, and 92 to the agricultural vehicle 12.

The controller 130 receives (e.g., via the transceiver 108) the vehicle path and/or the implement path. The agricultural vehicle 12 then proceeds to move along the vehicle path. During the control phase, at block 166, the controller 136 receives signals indicating a location of the agricultural implement 14 and/or the agricultural vehicle 12. At block 168, the controller 136 then compares the location of the agricultural implement with the determined implement path. For example, the controller 136 may compare a distance between the actual position of the agricultural vehicle and/or the agricultural implement to a threshold distance. In some embodiments, while the distance between the agricultural vehicle and/or the agricultural implement is below the threshold distance, the controller 136 may not control the vehicle based on the distance. In the event that the distance is greater than the threshold distance, at block 170, the controller 136 then controls the agricultural vehicle 12 to reduce the distance, thereby causing the agricultural vehicle and/or the agricultural implement to align with the vehicle path and/or the implement path to reduce overlapped and/or skipped regions. The variations in location may be sent back to the base station 22 (e.g., the base station controller) to be used in later path planning. For example, the base station controller may receive signals indicative of a location of the agricultural vehicle and/or the agricultural implement to enable the base station controller to identify at least one additional characteristic of the agricultural field, such as a slope, a bump, a hill, and the like. While the illustrated embodiments included the agricultural vehicle, any suitable number of agricultural vehicles may be used in the agricultural field.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural control system, comprising:
a base control system comprising a controller having a processor operatively coupled to a memory, wherein the controller is configured to:
plan an implement path through an agricultural field for an agricultural implement coupled to an agricultural vehicle based at least in part on at least one characteristic of the agricultural field;
plan a vehicle path of the agricultural vehicle based at least in part on the planned implement path and a lateral offset between the agricultural implement and the agricultural vehicle, wherein the lateral offset is a lateral distance between a lateral centerline of the agricultural implement and a lateral centerline of the agricultural vehicle while a hitch angle is zero; and
output a first signal to a vehicle control system indicative of the vehicle path;
wherein the controller is configured to plan the vehicle path based on a geometry of the agricultural vehicle, a geometry of the agricultural implement, a geometry of a hitch between the agricultural vehicle and the agricultural implement, or any combination thereof.

2. The agricultural control system of claim 1, wherein the geometry of the agricultural vehicle comprises a size of the agricultural vehicle, a shape of the agricultural vehicle, a weight of the agricultural vehicle, or any combination thereof, and the geometry of the agricultural implement comprises a size of the agricultural implement, a weight of the agricultural implement, a type of wheels of the agricultural implement, or any combination thereof.

3. The agricultural control system of claim 1, wherein the controller is configured to plan the vehicle path based on at least one capability of the agricultural vehicle, at least one capability of the agricultural implement, at least one capability of the hitch between the agricultural vehicle and the agricultural implement, or any combination thereof.

4. The agricultural control system of claim 3, wherein the at least one capability of the agricultural vehicle comprises a turn radius of the agricultural vehicle, a rate of change of direction of the agricultural vehicle, or any combination thereof, and the at least one capability of the agricultural implement comprises a turn radius of the agricultural implement, whether at least one wheel of the agricultural implement is controllable, or any combination thereof.

5. The agricultural control system of claim 1, wherein the controller is configured to plan the vehicle path based at least in part on the at least one characteristic of the agricultural field.

6. The agricultural control system of claim 1, wherein the at least one characteristic of the agricultural field comprises a location, a size, a shape, or any combination thereof, of a slope, a bump, a hill, a territorial boundary, an obstacle boundary, a body of water, a boulder, or any combination thereof.

7. The agricultural control system of claim 1, comprising the vehicle control system having a vehicle controller comprising a processor operatively coupled to a memory, wherein the vehicle controller is configured to receive the first signal indicative of the vehicle path, to receive a second signal indicative of the planned implement path, to output a third signal indicative of instructions to control a steering control system, a speed control system, or a combination thereof, to travel along the vehicle path, to receive a fourth signal indicative of a position of the agricultural implement, to determine an updated vehicle path based at least in part on a difference between the planned implement path and the position of the agricultural implement, and to output a fifth signal indicative of instructions to control the steering control system, the speed control system, or a combination thereof, to change a direction, a speed, or any combination thereof, of the agricultural vehicle based on the updated vehicle path.

8. The agricultural control system of claim 7, wherein the vehicle controller is configured to output a sixth signal indicative of the position of the agricultural implement to the base control system to enable the controller of the base control system to identify at least one additional characteristic of the agricultural field.

9. A non-transitory computer-readable medium comprising instructions configured to be executed by a processor of a base control system, wherein the instructions comprise instructions configured to cause the processor to:
plan an implement path through an agricultural field for an agricultural implement coupled to an agricultural vehicle based at least in part on at least one characteristic of the agricultural field;
plan a vehicle path of the agricultural vehicle based at least in part on the planned implement path and a lateral offset between the agricultural implement and the agricultural vehicle, wherein the lateral offset is a lateral distance between a lateral centerline of the agricultural implement and a lateral centerline of the agricultural vehicle while a hitch angle is zero; and
output a first signal to a vehicle control system of the agricultural vehicle indicative of the vehicle path;
wherein the instructions comprise instructions configured to cause the processor to plan the implement path based on a geometry of the agricultural implement, a geometry of the agricultural vehicle, a geometry of a hitch between the agricultural vehicle and the agricultural implement, or any combination thereof.

10. The non-transitory computer-readable medium of claim 9, wherein the instructions comprise instructions configured to cause the processor to plan the implement path based on at least one capability of the agricultural vehicle, at least one capability of the agricultural implement, at least one capability of the hitch between the agricultural vehicle and the agricultural implement, or any combination thereof.

11. The non-transitory computer-readable medium of claim 9, wherein the instruction comprise instructions configured to cause the processor of the base control system, a processor of the vehicle control system, or any combination thereof to receive the first signal indicative of the vehicle path, to receive a second signal indicative of the planned implement path, to output a third signal indicative of instructions to control a steering control system, a speed control system, or a combination thereof, to travel along the vehicle path, to receive a fourth signal indicative of a position of the agricultural implement, to determine an updated vehicle path based at least in part on a difference between the planned implement path and the position of the agricultural implement, and to output a fifth signal indicative of instructions to control the steering control system, the speed control system, or a combination thereof, to change a direction, a speed, or any combination thereof, of the agricultural vehicle based on the updated vehicle path.

12. The non-transitory computer-readable medium of claim 11, wherein the instructions comprise instructions configured to cause the processor of the base control system, the processor of the vehicle control system, or any combination thereof, to determine the updated vehicle path in a manner that reduces the difference between the planned implement path and the position of the agricultural implement.

13. An agricultural control system, comprising:
a base control system comprising a controller having a processor operatively coupled to a memory, wherein the controller is configured to:
plan an implement path through an agricultural field for an agricultural implement coupled to an agricultural vehicle based at least in part on at least one characteristic of the agricultural field;
plan a vehicle path of the agricultural vehicle based at least in part on the planned implement path and at least one of a capability of the agricultural implement and a capability of a hitch between the agricultural vehicle and the agricultural implement; and
output a first signal to a vehicle control system indicative of the vehicle path;
wherein the controller is configured to plan the vehicle path based on a lateral offset between the agricultural implement and the agricultural vehicle, wherein the lateral offset is a lateral distance between a lateral centerline of the agricultural implement and a lateral centerline of the agricultural vehicle while a hitch angle is zero; and
wherein the controller is configured to plan the vehicle path based on a geometry of the agricultural vehicle, a geometry of the agricultural implement, a geometry of the hitch between the agricultural vehicle and the agricultural implement, or any combination thereof.

14. The agricultural control system of claim 13, wherein the capability of the agricultural implement comprises at least one of a turn radius of the agricultural implement and whether at least one wheel of the agricultural implement is controllable.

15. The agricultural control system of claim 13, wherein the controller is configured to plan the vehicle path based on at least one capability of the agricultural vehicle.

16. The agricultural control system of claim 15, wherein the at least one capability of the agricultural vehicle comprises a turn radius of the agricultural vehicle, a rate of change of direction of the agricultural vehicle, or any combination thereof.

17. The agricultural control system of claim 13, wherein the geometry of the agricultural vehicle comprises a size of the agricultural vehicle, a shape of the agricultural vehicle, a weight of the agricultural vehicle, or any combination thereof, and the geometry of the agricultural implement comprises a size of the agricultural implement, a weight of the agricultural implement, a type of wheels of the agricultural implement, or any combination thereof.

* * * * *